United States Patent
Yumura et al.

(10) Patent No.: US 8,048,396 B2
(45) Date of Patent: Nov. 1, 2011

(54) METHOD FOR MANUFACTURING SINGLE-WALLED CARBON NANOTUBES

(75) Inventors: Morio Yumura, Tsukuba (JP); Satoshi Ohshima, Abiko (JP); Junzo Yana, Yokohama (JP); Kaori Fukuma, Fukuoka (JP)

(73) Assignees: Nikkiso Company Limited, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 692 days.

(21) Appl. No.: 11/792,962

(22) PCT Filed: Dec. 12, 2005

(86) PCT No.: PCT/JP2005/022768
§ 371 (c)(1),
(2), (4) Date: Sep. 6, 2007

(87) PCT Pub. No.: WO2006/064760
PCT Pub. Date: Jun. 22, 2006

(65) Prior Publication Data
US 2008/0107587 A1    May 8, 2008

(30) Foreign Application Priority Data
Dec. 13, 2004 (JP) .................................. 2004-360009

(51) Int. Cl.
*D01F 9/12* (2006.01)
(52) U.S. Cl. .................. 423/447.3; 423/447.1; 977/843
(58) Field of Classification Search .... 423/447.1–447.3, 423/445 B; 977/742–754, 842–848
See application file for complete search history.

(56) References Cited

U.S. PATENT DOCUMENTS

| | | | | | |
|---|---|---|---|---|---|
| 2,438,570 | A | * | 3/1948 | Mattox | .................... 585/486 |
| 6,752,977 | B2 | * | 6/2004 | Smalley et al. | ............ 423/447.1 |
| 6,790,426 | B1 | * | 9/2004 | Ohsaki | .................... 423/447.2 |

FOREIGN PATENT DOCUMENTS
JP    2001-081564 A    3/2001
(Continued)

OTHER PUBLICATIONS
Cheng, et al., Large-scale and low-cost synthesis of single-walled carbon nanotubes by the catalytic pyrolysis of hydrocarbons, Applied Physics Letters 1998; 72(25): 3282-3284.*

(Continued)

*Primary Examiner* — Daniel C. McCracken
(74) *Attorney, Agent, or Firm* — Holtz, Holtz, Goodman & Chick, PC (57) ABSTRACT

The objective of the present invention is to provide a process of producing single-walled carbon nanotubes, capable of producing single-walled carbon nanotubes with high purity. A process of producing single-walled carbon nanotubes according to the present invention includes feeding a feedstock including a hydrocarbon source, a metallocene, and a sulfur compound in a state of mist to a feeding zone where hydrogen gas flows at a linear velocity of 1-50 m/second wherein the amount of the hydrocarbon source is 0.01-0.2% by mass and the amount of the metallocene is 0.001-0.2% by mass based on the total amount of the hydrogen gas and the feedstock, and the amount by mass of the sulfur compound is ⅛-4 times as much as that of the metallocene; and making the hydrogen gas and the fed feedstock flow through a reaction zone with a temperature of 800-1000° C.

17 Claims, 2 Drawing Sheets

FOREIGN PATENT DOCUMENTS

| | | | |
|---|---|---|---|
| JP | 2002-293520 A | | 10/2002 |
| JP | 2003-146632 A | | 5/2003 |
| JP | 2003-146633 A | | 5/2003 |
| JP | 2003-221215 | * | 5/2003 |
| JP | 2003-201630 A | | 7/2003 |
| JP | 2003-221215 A | | 8/2003 |

OTHER PUBLICATIONS

Iijima, et al., Single-Shell carbon nanotubes of 1-nm diameter, Nature 1993; 363: 603-605.*

Iijima, et al., Single-Shell carbon nanotubes of 1-nm diameter, Nature 1993; 363: 603-605.*

Riichiro Saito et al., "Basics and Application of Carbon Nanotube," Mar. 31, 2004, Baifukan Co., Ltd., p. 120.

Kazuyoshi Tanaka, "Mechanical Strength of Carbon Nanotubes," Part III Properties and Application of Carbon Nanotube, Jan. 30, 2001, Kagaku-dojin Publishing Company, Inc., pp. 111 to 117.

* cited by examiner

METHOD FOR MANUFACTURING SINGLE-WALLED CARBON NANOTUBES

TECHNICAL FIELD

The present invention relates to a process for producing single-walled carbon nanotubes, more particularly to a process for specifically producing single-walled carbon nanotubes with high purity.

BACKGROUND ART

A carbon nanotube is a crystalline carbon with a structure in which a thin layer of graphite crystal is rolled-up into the shape of a cylinder. In other words, carbon atoms of which a carbon nanotube is composed from a graphene structure, which is a flat or curved layer formed by arranging six-membered rings of carbon atoms in a honeycomb. A cylindrical structure in which such a layer is rolled-up in one direction is the carbon nanotube. In general, those with a diameter of several nanometers to several ten of nanometers and a length of several ten times to not less than several thousand times longer than its diameter are called "carbon nanotubes". Carbon nanotubes are classified into single-walled carbon nanotubes formed by a single graphene layer rolled-up in the shape of a cylinder, which may be abbreviated to "SWCNT", and multi-walled carbon nanotubes formed by two or more graphene layers rolled-up in the shape of a cylinder, which may be abbreviated to "MWCNT". Furthermore, the single-walled carbon nanotubes take three types of shapes, which are "armchair", "zigzag", and "chiral", depending on how the six-membered rings are arranged.

The multi-walled carbon nanotubes have physical properties of large electric conductivity, high elasticity, high strength, etc. On the other hand, the single-walled carbon nanotubes have a wide variety of unique properties, such as high elasticity, electric properties that enable the nanotubes to be used as conductors or semiconductors; mechanical properties including extreme strength, thermal conductivity larger than the thermal conductivity of diamond, and occlusion and absorption of molecules. See, for example, patent document 1. The single-walled carbon nanotubes also have a Young's modulus of several thousand GPa, a tensile strength of several ten GPa, which is measured in a scanning electronic microscope. The single-walled carbon nanotubes further have a property of being hardly broken, to such an extent that upon the receipt of a bending stress they further deform, having a wave-like structure on the side of being compressed. See, for example, non-patent document 2. Therefore, the single-walled carbon nanotubes with these properties are expected to be applicable to various technical fields, such as antistatic agents, conductive ink and paint, hydrogen occluding agents, semiconductors, chemical reactions, supports for fuel-cell catalysts, materials for the negative electrode of secondary batteries, sensors, devices, fillers for composite materials, space craft and aircraft technologies, and bio- and medical-technologies.

Carbon nanotubes are normally produced by various methods, such as arc-discharge methods, laser evaporation methods, thermal CVD methods, wherein CVD stands for "chemical vapor deposition", and flowing vapor deposition methods. The arc-discharge method is a method of growing carbon nanotubes by means of arc discharge using carbon electrodes. The arc-discharge method is capable of producing an enormous amount of carbon nanotubes. The laser evaporation method typically forms carbon nanotubes by evaporating part of a graphite electrode by means of a laser. The thermal CVD method grows carbon nanotubes at a high temperature by thermally decomposing hydrocarbon, which is a carbon source, on a substrate with a metal catalyst thereon. The flowing vapor deposition method generates carbon nanotubes by making an organic transition metal compound and a hydrocarbon compound, which is a carbon source, both flowing with a carrier gas, react with each other at a high temperature. In addition to them, there are various methods such as a method of using a plasma chemical vapor deposition apparatus, a thermal chemical vapor deposition apparatus and the like, for example.

An example of more specific processes of producing carbon nanotubes is a process for producing carbon nanotubes at a high yield rate by arranging a carbon source polymer on a template and calcining it at a high temperature. See patent document 1. Another example is a chemical vapor deposition method capable of producing a great amount of carbon nanotubes. See patent document 2. Patent document 3 discloses a method of amorphous carbon nanotubes different from the above-mentioned carbon nanotubes. Patent document 4 teaches a method of producing carbon nanotubes by introducing an organic solvent solution that includes a catalyst metal compound, especially a salt of a catalyst metal dissolved in a solvent, into a heating oven at a temperature of 700° C. to 1500° C.

Carbon nanotubes can be produced by these methods. In order to apply single-walled carbon nanotubes with the aforementioned properties that multi-walled carbon nanotubes do not have to various technical fields, however, single-walled carbon nanotubes have to be produced with high purity. The problem associated with the above-mentioned methods is that they produce multi-walled carbon nanotubes, or a mixture of a major amount of multi-walled carbon nanotubes and a minor amount of single-walled carbon nanotubes. The production of single-walled carbon nanotubes is very difficult especially by the flowing vapor deposition method and the chemical vapor deposition method. Therefore in order to utilize single-walled carbon nanotubes in various technical fields, it is necessary to develop a method capable of specifically producing single-walled carbon nanotubes.

Patent document 1: JP-A-2003-146632

Patent document 2: JP-A-2001-81564

Patent document 3: JP-A-2002-293520

Patent document 4: JP-A-2003-221215

Non-patent document 1: Page 120 of "Basics and Applications of Carbon Nanotubes" written by Riichiro Saito et al., published on Mar. 31, 2004 by Baifukan Co., Ltd.

Non-patent document 2: Chapter 7, "Mechanical Strength of Carbon Nanotubes" of "Carbon Nanotubes" written by Kazuyoshi Tanaka, published on Jan. 30, 2001 by Kagaku-dojin Publishing Company, Inc.

DISCLOSURE OF THE INVENTION

Problems to be Solved by the Invention

An objective of the present invention is to provide a process for producing carbon nanotubes capable of producing single-walled carbon nanotubes with high purity.

Another objective of the present invention is to provide a process of producing carbon nanofibers capable of producing a large amount of single-walled carbon nanotubes continuously.

Means to Solve the Problems

In order to solve the aforementioned problems:

The first means is a process of producing single-walled carbon nanotubes comprising feeding a feedstock including a hydrocarbon source, a metallocene, and a sulfur compound in a state of mist to a feeding zone where hydrogen gas flows at a linear velocity of 1 to 50 m/second, wherein the amount of the hydrocarbon source is from 0.01 to 0.2% by mass and the amount of the metallocene is from 0.001 to 0.2% by mass, based on the total amount of the hydrogen gas and the feedstock, and the amount by mass of the sulfur compound is from ⅛ to 4 times as much as that of the metallocene; and making the hydrogen gas and the fed feedstock flow through a heated reaction zone, the temperature of which has been set to from 800 to 1000° C.

The second means is the process of producing single-walled carbon nanotubes according to the first means wherein the feeding zone has a temperature not more than the boiling point of the hydrocarbon source.

The third means is the process of producing single-walled carbon nanotubes according to the first or second means wherein the feedstock passes through the feeding zone in 0.1 to 10 seconds.

The fourth means is the process of producing single-walled carbon nanotubes according to any one of the first to third means wherein the produced single-walled carbon nanofibers have an average diameter of 0.5 to 2 nm.

Advantages of the Invention

In the process of producing single-walled carbon nanotubes according to the present invention, the feedstock in a state of mist is fed into the feeding zone where hydrogen gas flows. Therefore it takes some time for the feedstock in droplets to evaporate while it is dispersing into the hydrogen gas and for the metallocene to be decomposed subsequently. Then, around a small particle of the metal formed by the decomposition of the metallocene there are more carbon atoms produced by the decomposition of the hydrocarbon source included in the feedstock than other metal particles. This situation allows the small metal particle to contact a plurality of carbon atoms before metal particles become agglomerate, which results in the formation of minute seeds of a metal carbide. Carbon atoms contact the seeds of the metal carbide one after another, and the atoms are bonded to each other to grow longitudinally in the shape of a tube. Since the metal particles are not an agglomerate, a seed of the metal carbide is minute, which imparts a single-walled graphene structure to the tube. Therefore, the process of producing single-walled carbon nanotubes according to the present invention is capable of specifically producing single-walled carbon nanotubes with high purity.

Also, because the process of producing single-walled carbon nanotubes according to the present invention makes the hydrogen gas pass through the feeding zone and the reaction zone successively, single-walled carbon nanotubes with high purity can specifically be produced.

Since the process of producing single-walled carbon nanotubes according to the present invention includes the step of feeding the feedstock in a state of mist into hydrogen gas flowing at a constant rate, the time period in which the feedstock passes through the reaction zone is always constant, which produces single-walled carbon nanotubes with almost uniform properties.

BRIEF DESCRIPTION OF DRAWINGS

FIG. 2(a) illustrates the formation mechanism of single-walled carbon nanotubes when the feedstock in a state of mist is fed, while FIG. 2(b) illustrates that of multi-walled carbon nanotubes when the feedstock in a state of gas is fed.

EXPLANATION OF REFERENCE NUMERALS

1 . . . apparatus; 2 . . . reaction tube; 10 . . . feeding zone; 11 . . . reaction zone; 12 . . . hydrogen gas introducer; 13 . . . feedstock feeder; 14 . . . heater; 15 . . . cooler; 16 . . . isolator; 17 . . . temperature-adjusting device for feedstock; 18 . . . current plate; 19 . . . end of nozzle; 30 . . . feedstock; 31 . . . metallocene; 32 . . . hydrocarbon source; 33 . . . sulfur compound; 34 . . . carbon atom; 35 . . . metal carbide; 36 . . . metal particle agglomerate; 37 . . . metal carbide agglomerate; 40 . . . single-walled carbon nanotube; 41 . . . multi-walled carbon nanotube

BEST MODE TO CARRY OUT THE INVENTION

Figure 1:
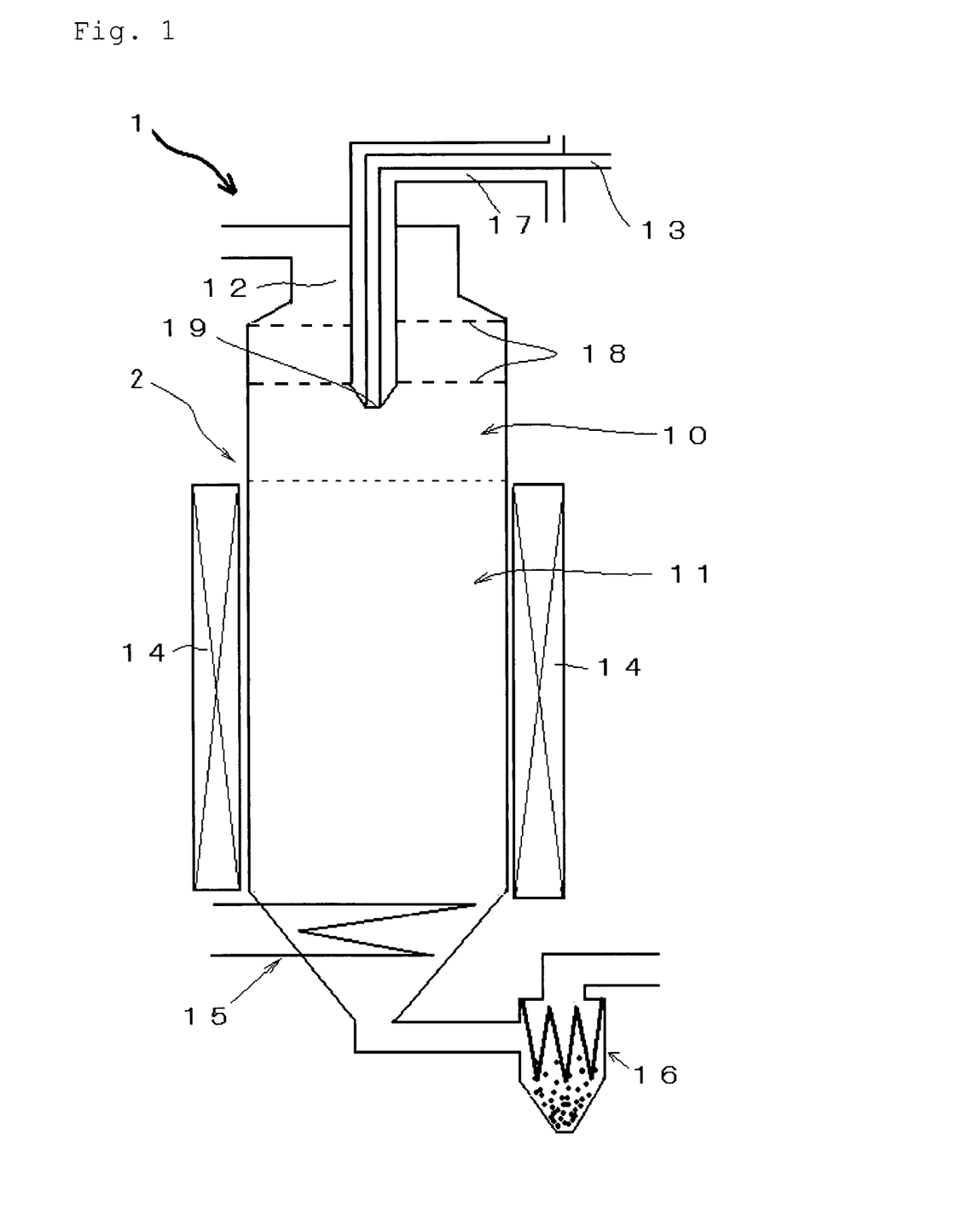
FIG. 1 is a schematic diagram showing an example of the apparatus capable of carrying out the process of producing single-walled carbon nanotubes according to the present invention.

FIG. 1 is a schematic diagram showing an example of the apparatus capable of carrying out the present invention.

As shown in FIG. 1, the apparatus 1 is provided with a reaction tube 2 in the shape of a cylinder including a feeding zone 10 and a reaction zone 11 located just below the feeding zone 10 and adjoined thereto; a hydrogen gas introducer 12, provided above the feeding zone 10, for making hydrogen gas flow along the inner wall of the reaction tube 2; a feedstock feeder 13, communicating with the feeding zone 10 where the hydrogen gas flows from the hydrogen gas introducer 12, for feeding a feedstock to the feeding zone 10; a heater 14 for heating the reaction zone 11 to a temperature of 800° C. to 1000° C.; a cooler 15, provided under the reaction zone 11, for cooling the hydrogen gas flowing from the reaction zone 11 and the product mixture; and an isolator 16, located downstream of the cooler 15, for isolating single-walled carbon nanotubes from the product mixture. This apparatus 1 further includes a temperature-adjusting device for feedstock 17 to adjust the temperature of the feedstock when it is fed into the feeding zone 10, the device surrounding the outside of the feedstock feeder 13; and a current plate 18, placed in the hydrogen gas introducer 12, just upstream of the feeding zone 10, for homogenizing the current of the hydrogen gas. More specifically, as shown in FIG. 1, the feedstock feeder 13 of this apparatus 1, for example a feedstock-feeding nozzle, is surrounded by the temperature-adjusting device for feedstock 17 almost to the end 19 of the nozzle. The nozzle is so placed that the nozzle runs along the central axis of the reaction tube 2 in the vicinity of the axis and the nozzle end 19 projects downward from the current plate 18 that is located inside the hydrogen gas introducer 12.

This apparatus 1 is a vertical apparatus used to carry out methods such as flowing vapor deposition methods and chemical vapor deposition methods. Because the feedstock feeder 13 of a vertical apparatus is liable to be heated by the heat from the reaction zone 11 located under the feeding zone 10, the temperature-adjusting device for feedstock 17 is a cooler.

Hydrogen gas employed in the process of producing single-walled carbon nanotubes according to the present invention is appropriate for the carrier gas, because hydrogen gas has low reactivity with the hydrocarbon source, which will be explained hereinafter, and carbon atoms produced by the decomposition of the hydrocarbon source, and hydrogen gas does not hinder the function of the catalyst and the formation of single-walled carbon nanotubes. The hydrogen gas should have such purity that it has low reactivity with the hydrocarbon source and carbon atoms and does not hinder the function of the catalyst and the formation of single-walled carbon nanotubes, for example, a purity of 99.9%. As long as the objectives of the present invention can be achieved, the hydrogen gas may include stable gases that are not oxidative or are weakly oxidative at the temperature of reaction zone 11, such as nitrogen gas and methane gas, in a small amount, such as 0.5% by mass or less. In order to help the feeding of the feedstock, part of the hydrogen gas may be fed to the reaction zone 11 from the feedstock feeder 13 together with the feedstock.

The feedstock used for the process of producing single-walled carbon nanotubes according to the present invention includes a hydrocarbon source, a metallocene, and a sulfur compound.

The hydrocarbon source may be any hydrocarbon compound that can be decomposed into a carbon source at a high temperature. Among others, aromatic hydrocarbon compounds are excellent as a carbon source due to its high carbon-to-hydrogen proportion and relatively high boiling point. Preferable hydrocarbon sources include benzene, toluene, xylene, naphthalene, coal-carbonized oil that contain a great amount of aromatic hydrocarbons, thermally decomposed oil obtained by thermal decomposition of hydrocarbon compounds, and coal-liquefied oil, from the viewpoint of their easiness to spray, stability, easiness to handle and procure, and the like. Of course, a hydrocarbon mixture containing them may also be a preferable hydrocarbon source. In addition, hydrocarbon sources containing organic compounds with heteroatoms, such as alcohols, may also be employed.

The metallocene mainly works as a catalyst. The employment of a metallocene makes it possible to produce single-walled carbon nanotubes with high purity continuously. The central metal of the metallocene may be, for example, Fe, Ti, V, Cr, Co, Ni, or Ru. Examples of the metallocene may include ferrocene, nickelocene, ziroconocene, and titanocene. Among them, ferrocene and nickelocene are preferable, and ferrocene is the most preferable.

The main function of the sulfur compound is catalysis. The employment of the sulfur compound lowers the melting point of the metal carbide produced by the contact between the metal particles and the carbon atoms, which leads to an efficient production of single-walled carbon nanotubes. For the sulfur compound may be used any compound that is decomposed at a high temperature to generate sulfur. Examples of the sulfur compound may include aromatic sulfur compounds such as mercaptans, sulfides, and thiophenes, hydrogen sulfide, and carbon disulfide. Among them, the aromatic sulfur compounds are preferable. Specifically preferable are thiophenes including thiophene.

The process of producing carbon nanotubes according to the present invention begins with introducing hydrogen gas into the reaction tube 2. As shown in FIG. 1, hydrogen gas is introduced into the feeding zone 10 from the hydrogen gas introducer 12 at a linear flow velocity of 1 to 50 m/second and made to flow downward along the inside face of the wall of the reaction tube 2. Preferably the linear flow velocity should be from 1 to 50 m/sec. When the linear flow velocity is less than 1 m/sec., the hydrogen gas current becomes unstable, which may lower the yield, let the heat cause turbulence in the current, let the product adhere to the wall of the reaction tube, and produce multi-walled carbon nanotubes. On the other hand, the linear flow velocity of 50 m/sec. or more may cause turbulence in the hydrogen gas current, cause the temperature of the feedstock to rise insufficiently, and decrease the yield. Furthermore, when the linear current velocity of the hydrogen gas is within that range, the pressure around the nozzle end 19 may be reduced slightly, which enables the feedstock to come to the feeding zone from the feedstock feeder 13 in a desired way. Thus, single-walled carbon nanotubes with high purity can be produced specifically. Note that the linear flow velocity of the hydrogen gas is the initial linear flow velocity of the hydrogen gas sent from the hydrogen gas introducer 12. The velocity is set to a linear flow velocity of 3 to 5 m/sec. by adjusting a valve for regulating the mass flow rate and the flow rate of the hydrogen gas, placed in the pipe through which hydrogen gas is sent to the introducer. The linear flow velocity is measured with a mass flowmeter.

In the process of producing single-walled carbon nanotubes according to the present invention, the hydrogen gas should be heated before it is introduced into the feeding zone 10. In order to preheat hydrogen gas, a heater or a similar device may be placed in the hydrogen gas path of the hydrogen gas introducer 12. Alternatively, the cooler 15, which will be explained hereinafter, may be used as a heat exchanger to preheat the hydrogen gas.

Thus, the hydrogen gas is introduced into the reaction tube 2. While the hydrogen gas current is being made stable, the feedstock is supplied to the feedstock feeder 13. In the process of producing single-walled carbon nanotubes according to the present invention, the feedstock is so supplied to the feedstock feeder 13 that the supply pressure of the mixture is from 0.8 to 1.3 atmospheric pressure, preferably from 1.0 to 1.2 atmospheric pressure. Also, the temperature of the feedstock feeder 13 has to adjusted to such a temperature that the feedstock supplied to the feedstock feeder 13 has a temperature not more than the boiling point of the hydrocarbon source, or such a temperature that at least the hydrocarbon source included in the feedstock does not evaporate or each component included in the feedstock does not decompose, at the state of being supplied, more specifically at the supply pressure and the concentration of being supplied. In other words, it is important that the temperature be adjusted to such a temperature that the feedstock having been supplied into the feedstock feeder 13 can remain in droplets. The temperature is, for example, from 20 to 200° C., preferably from 50 to 150° C., more preferably from 50 to 130° C.

For the means to adjust the temperature of the feedstock supplied to the feedstock feeder 13 may be employed, for example, a temperature-adjusting device for the feedstock 17 that is so provided that the temperature-adjusting device surrounds the outer periphery of the feedstock feeder 13. The temperature-adjusting device for the feedstock 17 may be a general temperature adjuster capable of adjusting the temperature of the feedstock that is supplied into the feedstock feeder 13. Examples of the temperature adjuster may include a cooling device or a heating device utilizing a liquid such as a coolant or a heating medium, or a gas such as a coolant gas or a heating gas, an electric heater, and a heat circulation device that circulates the heat generated in the reaction tube 2 for the reuse. When this heat circulation device employs hydrogen gas for the coolant gas, the hydrogen gas can be introduced into the reaction tube 2 from the hydrogen gas introducer 12.

When the hydrogen gas current becomes stable, the feedstock feeder 13 is ready to feed the feedstock, and the temperature of the reaction zone 11 reaches 800 to 1000° C., the feedstock feeder feeds the feedstock in a state of mist with a predetermined composition based on the total amount of the hydrogen gas and the feedstock into the hydrogen gas flowing in the feeding zone 10. The predetermined composition specifically means that the concentration of the hydrocarbon source included in the feedstock is from 0.01 to 2.0% by mass, the concentration of the metallocene included in the feedstock is from 0.001 to 0.2% by mass, and the ratio of the mass of the sulfur compound included in the feedstock to that of the metallocene is from 1/5 to 4, based on the total mass of the hydrogen gas and the feedstock. The concentration of the hydrocarbon source should preferably be from 0.05 to 0.7% by mass, more preferably from 0.05 to 0.5% by mass. The concentration of the metallocene should preferably be from 0.003 to 0.05% by mass. The concentration of the sulfur compound should preferably be such that the mass of the sulfur compound is from 1/5 to 1 time as much as that of the metallocene. When the feedstock in the aforementioned composition is fed to the hydrogen gas flowing in the feeding zone 10, a plurality of metal particles, produced by the decomposition of the metallocene included in the feedstock, diffuse into the hydrogen gas, which significantly lowers the probability that there are other metal particles in the vicinity of a metal particle. Therefore, before the metal particles agglomerate with one another, a metal particle is able to contact with a plurality of carbon atoms and specifically form a single-walled carbon nanotube.

Note that the concentration of each component is calculated by adding up the mass of the hydrogen gas introduced from the hydrogen gas introducer 12, wherein the mass is the mass of hydrogen gas under the condition that the temperature is 20° C. and the pressure is 1 atmospheric pressure, and the mass of each component included in the feedstock fed into the hydrogen gas, to obtain the total of the masses, and calculating the concentration or the percentage by mass of each component based on the total.

When the feedstock in a state of mist is fed into the hydrogen gas flowing in the feeding zone 10, it takes time for the feedstock in droplets to evaporate and for the metallocene included in the feedstock to decompose, which leads to a specific production of single-walled carbon nanotubes with high purity. Also, the productivity is improved because byproducts such as amorphous carbon and tar do not adhere to the nozzle end 19 of the feedstock feeder 13.

The method of feeding the feedstock in a state of mist in the aforementioned way may be any method as long as it can feed the feedstock in a state of mist composed of droplets. Examples of the method may include a method of adjusting of the pressure for supplying the feedstock to the feedstock feeder 13 to, for example, 0.8 to 1.3 atmospheric pressure; a method of adjusting the linear flow velocity of the hydrogen gas introduced by the hydrogen gas introducer 12 and passing in a close proximity of the nozzle end 19 to such a pressure that is much smaller than the supplying pressure; a method of making smaller the diameter of the opening of the nozzle end 19 of the feedstock feeder 13; a method of adjusting the temperature of the feedstock to, for example, a temperature not higher than the boiling point of the hydrocarbon source; a method of adjusting the temperature of the atmosphere in the vicinity of the nozzle end 19 to, for example, a temperature not higher than the boiling point of the hydrocarbon source; and combinations thereof. In order to feed the feedstock in a state of mist, at least one of the recited methods should be employed.

In the apparatus 1 shown in FIG. 1, the feedstock in a state of mist is fed into the feeding zone by adjusting the pressure of supplying the feedstock to the feedstock feeder 13 with the nozzle end 19 whose opening has a small diameter, to such a pressure that the pressure around the nozzle end 19 is made slightly lower than the supplying pressure, by the flow of the hydrogen gas introduced from the hydrogen gas introducer 12, and by adjusting the temperature of the feedstock feeder 13 and that of the atmosphere surrounding the nozzle end 19 to such temperatures that both of the feedstock supplied to the feedstock feeder 13 and the feedstock fed from the nozzle end 19 are in droplets at the temperatures. In other words, in the apparatus 1 shown in FIG. 1, the temperature of the feedstock feeder 13 and that of the atmosphere around the nozzle end 19 are adjusted to temperatures at which the feedstock is maintained in the form of droplets, and at these temperatures the feedstock is drawn to the feeding zone 10 gradually or continuously, by a small difference between the supplying pressure of the feedstock and the pressure surrounding the nozzle end 19, whereby the feedstock in a state of mist is fed to the feeding zone 10.

It is important that the temperature of the atmosphere around the nozzle end 19 in the reaction tube 2, as well as the temperature of the feedstock feeder 13, be adjusted to a temperature at which the feedstock just after being fed to the feeding zone 10 has a temperature not higher than the boiling point of the hydrocarbon source under the conditions of being fed, e.g. at the pressure and at the composition of the feedstock being fed, or a temperature at which the components included in the feedstock do not decompose. In other words, it is essential that the temperature be adjusted to a temperature at which the feedstock fed into the feeding zone 10 can maintain the state of being in droplets for a predetermined time period. An example of such a temperature is 200° C. or less. The temperature should preferably range between 50 and 200° C., more preferably between 80 and 130° C. The temperature of the atmosphere surrounding the nozzle end 19 may be the same as that of the feedstock feeder 13, or different from it.

In order to adjust the temperature of the atmosphere surrounding the nozzle end 19 to a temperature not more than the boiling point of the hydrocarbon source may be employed, for example, a method of heating or cooling in advance the hydrogen gas introduced from the hydrogen gas introducer 12, a method of adjusting the linear velocity of the hydrogen gas flowing from the hydrogen gas introducer 12, a method of placing at least one heater or cooler along the perimeter of the feeding zone 10 where the nozzle end 19 is situated, or combinations thereof. The temperature of the atmosphere surrounding the nozzle end 19 can be measured with a thermometric device such as an optical pyrometer from the outside of the reaction tube 2.

When the temperature of the feedstock feeder 13 and that of the atmosphere surrounding the nozzle end 19 are controlled to a temperature not more than the boiling temperature of the hydrocarbon source, the temperature of the feeding zone 10 is so controlled that it gradually rises from the atmosphere surrounding the nozzle end 19 toward the reaction zone 11 that is heated to 800 to 1000° C. More specifically, in the feeding zone 10, the temperature of the atmosphere around the nozzle end 19 is a temperature at which the feedstock can maintain its state of being droplets, or a temperature not more than the boiling point of the hydrocarbon source. The temperature of the feeding zone 10 gradually rises toward the reaction zone 11, and it is from 800 to 1000° C. just before the reaction zone 11.

The feeding of the feedstock in the predetermined composition to the feeding zone 10 with the aforementioned temperature profile is able to effectively check side reactions that produce by-products such as amorphous carbon and tar, which results in a specific production of single-walled carbon nanotubes with high purity. We will discuss, referring to FIG. 2, the mechanism of producing single-walled carbon nanotubes by the process according to the present invention. In order to simplify the description of the mechanism, we will not discuss the functions of the sulfur compounds. Also, it is unknown in the following explanation in which one of the feeding zone 10 and the reaction zone 11 the decomposition of the components included in the feedstock and the recombination of the carbon atoms mainly take place.

Figure 2:
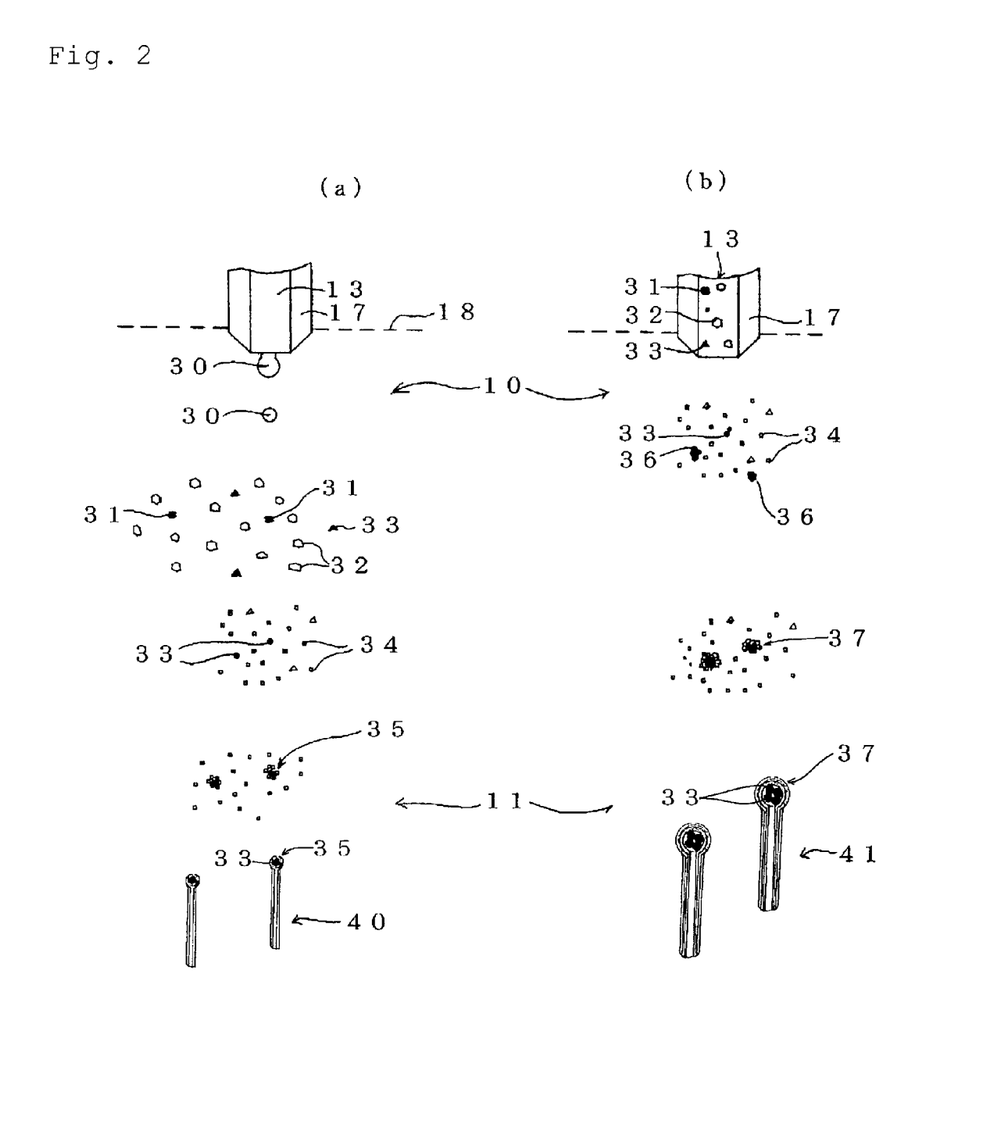
FIG. 2 is an illustration showing the mechanism of the formation of carbon nanotubes.

As shown in FIG. 2(*a*), the feedstock 30 fed from the feedstock feeder 13 maintains the state of mist composed of droplets in the first place. As the feedstock descends in the feeding zone 10, the droplets of the feedstock 30 diffuse into the hydrogen gas, the hydrocarbon source included in the feedstock 32 evaporates, and the metallocene 31 and the sulfur compound 33 included in the feedstock 30 become exposed. At the same time, or a littler later, carbon atoms 34 are formed by the decomposition of the hydrocarbon source 32, and metal particles 33 are formed by the decomposition of the metallocene 31 included in the feedstock 30. In other words, it takes some time for the metallocene 31 to decompose. Then, because the feedstock 30 has been fed in the aforementioned predetermined composition, and the hydrocarbon source 32 and the metallocene 31 have been diffused into the hydrogen gas, there are many carbon atoms 34 in the vicinity of a metal particle 33. In this state, a metal particle 33 contacts carbon atoms 34 to form small seeds of metal carbide 35 on the surface of the metal particle, before metal particles 33 agglomerate. There still exist many carbon atoms 34 in the vicinity of a seed of metal carbide 35, and when carbon atoms 34 contact the seed of metal carbide 35, the carbon atoms bond together in the form of a tube, starting from the seed. The metal particles 33 do not agglomerate as mentioned above, which ensures that a seed of metal carbide 35 is small. Thus, the tube growing from the small seed forms a single-walled graphene structure, and single-walled carbon nanofibers are formed.

When the temperature of the feedstock feeder 13 and that of the atmosphere surrounding the nozzle end 19 are less than 20° C., the temperature of the fed feedstock may rise too slowly to ensure the decomposition of the hydrocarbon source and the catalyst, which reduces the amount of the produced single-walled carbon nanotubes.

On the other hand, if the temperature of the atmosphere surrounding the nozzle end 19 is set to a temperature beyond the boiling point of the hydrocarbon source and/or the temperature of the feedstock feeder 13 is adjusted to a temperature more than the boiling point of the hydrocarbon source, the feedstock will be fed from the nozzle end 19 of the feedstock feeder 13 in the form of not mist but gas, as shown in FIG. 2(*b*). In this case, the hydrocarbon source 32 included in the feedstock evaporates in the feedstock feeder 13, and the components 31, 32, and 33 included in the feedstock diffuse and go away from each other, which leads to insufficient function of the catalyst. Besides, the metallocene 31 fed into the feeding zone 10 decomposes instantly, and the produced metal particles 33 agglomerate before the particles 33 contact carbon atoms 34. As a result, the metal particle agglomerates contact the carbon atoms 34, and seeds of metal carbide 37 with a large particle size are formed on the surfaces of the agglomerates, which causes the bonding of the carbon atoms 34 from a seed with a large particle size. Because metal particles 33 agglomerate, which makes the seeds of metal carbide 36 bigger, the tube growing from the seed 36 would form a graphene structure with two or more walls, and multi-walled carbon nanotubes 41 are formed with priority. Besides, the feedstock may decompose in the feedstock feeder 13 to form carbon atoms and metal particles, which sometimes stop-up the nozzle end 19 of the feedstock feeder 13. Furthermore, the production of by-products, such as amorphous carbon and tar, may reduce the yield and purity of the final products.

If a spray is employed for the feedstock feeder 13 in the process of single-walled carbon nanotubes according to the present invention, the feedstock is sprayed from the spraying nozzle in the form of large drops and not in the state of mist. Therefore metal particles obtained from many metallocene molecules 31 agglomerate and metal carbide seeds with a very large particle size are formed, which contributes to a specific production of multi-walled carbon nanotubes.

The linear velocity of the feedstock fed in this way should preferably be from 0.1 to 0.9 times smaller than the linear flow velocity of the hydrogen gas, more preferably from 0.6 to 0.8 times. When the ratio of the linear velocity of the feedstock and that of the hydrogen gas is within the range, the dispersibility of the hydrocarbon source and the catalyst in the feeding zone 10 and/or the reaction zone 11 is raised, which results in an improvement in the properties, purity, and yield of the produced single-walled carbon nanotubes.

In the process of producing single-walled carbon nanotubes according to the present invention, the feedstock mixture should be fed in generally the same direction as the hydrogen gas, as mentioned above. In other words, it is not preferable that the feedstock is fed in directions different from the hydrogen gas current, so that the feedstock mixture hits the inside face of the wall of the reaction tube 2. If the feedstock is so fed that the feedstock hits the inside face of the wall of the reaction tube 2, carbon atoms produced by thermal and/or catalytic decomposition of the hydrocarbon source are deposited on the inside face, which may result in marring the continuous production and a hindrance to the smooth flow of the hydrogen gas and formed single-walled carbon nanotubes. Besides, carbon nanotubes growing from the deposited carbon atoms may have an extremely large diameter. In order to feed the feedstock into the hydrogen gas current in such a way that the feedstock will not hit the inside face of the wall of the reaction tube 2 may be employed a method of introducing the hydrogen gas from the hydrogen gas introducer in such a way that the gas flows on and along the inside face, a method of placing the feedstock feeder 13 at around the center of the transverse section of the reaction tube 2 and feeding the feedstock so that the feedstock flows parallel with the current of the hydrogen gas, or combinations thereof.

The next step in the process of producing single-walled carbon nanotubes according to the present invention is to send the components including the hydrogen gas, the feedstock that has been fed, the metal particles with seeds of the metal carbide thereon, the carbon atoms and the metal particles to the reaction zone 11 with a temperature of 800 to 1000° C. and make them flow in the zone.

The reaction zone is maintained at a temperature of 800 to 1000° C. with a heater 14, which makes it possible to quickly heat the components such as the hydrogen gas and the feedstock that have been sent into the reaction zone 11 to a desirable temperature between 800° C. and 1000° C. If the temperature is less than 800° C., the efficiency of decomposition of the feedstock may be lowered, which reduces the yield of single-walled carbon nanotubes. On the other hand, when the temperature exceeds 1000° C., it will raise the temperature of the feeding zone 10 and may contribute to the formation of the metal carbide seeds with a large particle size, which in turn causes the production of multi-walled carbon nanotubes.

The time period for which the components including the feedstock and the metal particles with seeds of the metal carbide thereon pass through the reaction zone 11, or the time period for which the components including the feedstock and the metal particles with seeds of the metal carbide thereon are in the reaction zone 11, should preferably be from 0.1 to 10 seconds, more preferably from 0.3 to 5 seconds. The time period within this range will improve the purity and yield of the produced single-walled carbon nanotubes.

The temperature of the reaction zone 11 can be adjusted with, for example, a heater 14 that is arranged on the outside face of the peripheral wall of the part of the reaction tube 2, which part is located within the reaction zone 11, as shown in FIG. 1. The heater 14 could be anything as long as it can heat the reaction zone to a temperature of 800 to 1000° C. The heater can be a general heating device including, for example, electric heaters, high-frequency heaters, and devices utilizing a heating medium.

In the next step of the process according to the present invention, the product mixture including the hydrogen gas, the single-walled carbon nanotubes, and by-products that passed through the reaction zone 11 is cooled, and the single-walled carbon nanotubes are isolated from the product mixture. For example, in the apparatus 1 shown in FIG. 1, the product mixture including single-walled carbon nanotubes formed in the reaction zone 11 is guided to the area under the reaction zone 11, and is cooled with a cooler 15 placed under the reaction zone 11, whereby the reaction is terminated. The cooled product mixture is further guided to the downstream of the cooler 15, and single-walled carbon nanotubes are isolated from the product mixture with an isolator 16 provided downstream of the cooler 15.

The cooler 15 may be a cooling device using water or a coolant. If the user intends heat recovery to improve the productivity, the cooling device may utilize the hydrogen gas before being introduced or the feedstock before being fed into the reaction tube 2 as coolant. For the isolator 16 it may be appropriate to utilize filters, cyclone separators, etc. While a filter as isolator 16 is intended to be used in the apparatus 1 shown in FIG. 1, separators such as bag filters and cyclone separators are appropriate for industrial production. Also, a combination of several cyclone separators or a combination of cyclone separators and bag filters may be employed to classify single-walled carbon nanotubes by their diameters and lengths.

The single-walled carbon nanotubes thus isolated sometimes include about 40% by mass of metal. Therefore the metal originating from the catalyst may be removed with acids and washing water by ordinary methods. Tar, unreacted portions of the feedstock and the hydrocarbon source, and other impurities may be removed with organic solvents by ordinary methods.

The product mixture from which the single-walled carbon nanotubes have been isolated is mainly composed of hydrogen gas, all or part of which may be reused as hydrogen gas without any treatment or after impurities are removed.

In the apparatus 1 shown in FIG. 1, the product mixture may be guided to the cooler 15 by means of nitrogen gas. When the coolant 15 uses nitrogen gas as coolant, nitrogen gas may be circulated to blow the single-walled carbon nanotubes.

Preferably, 80% by mass or more of the single-walled carbon nanotubes obtained by the process of producing single-walled carbon nanotubes according to the present invention should have a diameter of 0.5 to 2 nm. It is more preferable if the weight average diameter of the obtained single-walled carbon nanotubes is from 0.5 to 2 nm, and particularly preferable if it is from 1 to 2 nm. Also, not less than 80% by mass of the obtained single-walled carbon nanotubes should have a length from 100 to 10,000 nm, particularly preferably from 50 to 1,000 nm.

The process of producing carbon nanotubes according to the present invention is capable of producing single-walled carbon nanotubes with high purity at a yield of 80% by mass or more based on the amount of the carbon of the hydrocarbon source, with no or little production of by-products such as multi-walled carbon nanotubes, amorphous carbon, and tar formed from thermally decomposed hydrocarbon.

Furthermore, by the process of producing carbon nanotubes according to the present invention can be produced single-walled carbon nanotubes with almost uniform diameters and lengths. For example, not less than 80% by mass of the single-walled carbon nanotubes with a weight average diameter of 2 nm and an average length of 2 μm have diameters of the average diameter within plus or minus 10% and lengths of the average length within the same range.

Whether or not the obtained carbon nanotubes are single-walled carbon nanotubes can be checked by observing images of the obtained photographed with a transmission electron microscope, which is often abbreviated to TEM, and by the existence of the radical breathing mode, which is often abbreviated to RBM, peculiar to the single-walled carbon nanotube in a Raman spectrum of the obtained carbon nanotubes.

By the process of producing single-walled carbon nanotubes according to the present invention, single-walled carbon nanotubes may be produced batchwise by feeding the feedstock into the flowing hydrogen gas batch by batch. Alternatively, single-walled carbon nanotubes may be produced continuously by feeding the feedstock into the flowing hydrogen gas continuously, which is advantageous from the viewpoint of good productivity of a continuous production.

The apparatus 1 shown in FIG. 1 is an example of the apparatus that can be used for the process of producing single-walled carbon nanotubes according to the present invention. Needless to say, apparatuses other than the apparatus 1 may be used to carry out the process of the present invention. Also, as long as the objectives of the invention can be achieved, various modifications can be made to the apparatus 1. For example, the apparatus 1 may be provided with several feedstock feeders, although the apparatus 1 in FIG. 1 is provided with one feedstock feeder 13. The apparatus 1 is a vertical downward flow type because it has various advantages including very tight control of the diameters and lengths of single-walled carbon nanotubes. However, apparatuses of a vertical upward flow type and a horizontal type can also produce single-walled carbon nanotubes with high purity, the goal of the present invention.

EXAMPLES

Working Examples 1-3 and Comparative Examples 1-8

The apparatus 1 shown in FIG. 1 was used. The length of the reaction tube 2, which means the total of the length of the feeding zone 10 and that of the reaction zone 11, was 2 meters. The feeding zone 10 extended from the upper part of the reaction tube 2, specifically the nozzle end 19, to the level at about ⅙ of the total length from the top. The area next to the feeding zone 10 was assigned to the reaction zone 11. Hydrogen gas was so introduced into the reaction tube 2 from the hydrogen gas introducer 12 that the gas flows along the inside face of the wall of the reaction tube 2 at a linear velocity of 1 m/sec. On the other hand, a feedstock including toluene, ferrocene, and thiophene was supplied to the feedstock feeder 13 at a supplying pressure of 1.1 atmospheric pressure, and the temperature of the feedstock was adjusted to the temperature at which the feedstock was fed, shown in Table 1. The reaction zone 11 was so heated with the heater 14 that the temperature of the reaction zone 11 was adjusted to the reaction temperature, also shown in Table 1. Under these conditions, the temperature of the atmosphere surrounding the nozzle end 19 was measured with an optical pyrometer. The temperature was not more than the boiling point of toluene.

Then, the feedstock was so fed from the feedstock feeder 13 that the mixture of the hydrogen gas and the feedstock passing through the feeding zone 10 consists of 99.935% by mass of hydrogen gas, 0.05% by mass of toluene, 0.01% by mass of ferrocene, and 0.005% by mass of thiophene, wherein the total of the components were 100% by mass. Under these conditions, the fed feedstock was in a state of mist due to the flowing of the hydrogen gas, the temperature at which the feedstock was supplied, the state in which the feedstock was supplied, and the heat from the reaction zone that had been heated to 800° C. to 1000° C. The feeding rate of the feedstock was so adjusted that the time necessary to pass through the feeding and reaction zones was a passing-through-time including the "reaction time" shown in Table 1. Specifically, the feeding rate was 1 mL/minute in Working Example 1.

Single-walled carbon nanotubes were continuously produced for 60 minutes under the conditions of each of the working and comparative examples. Then, the carbon nanotubes isolated with the isolator 16 were washed in an ordinary way with acids and washing water. The products were obtained. In the working and comparative examples, the nozzle end 19 was observed with the eye to check whether or not adhesives stick to the nozzle end 19, and the amount of the adhesives if they stick to it, after cooling the apparatus 1, especially the reaction zone 11, and replacing the atmosphere with air.

In each of the working and comparative examples, the yield of the carbon compounds based on the amount of the fed feedstock (% by mass), the yield of the carbon nanotubes (CNT) based on the amount of the fed feedstock (% by mass), and the percentage of impurities included in the single-walled carbon nanotubes obtained at the above-mentioned yield (% by mass) were calculated and are shown in Table 2. The impurities in Table 2 mean all the products other than the single-walled carbon nanotubes. The impurities include, for example, multi-walled carbon nanotubes, amorphous carbon, tar, and soot.

Several specimens of the product produced in each of the working and comparative examples were randomly sampled, and whether or not they were single-walled carbon nanotubes were checked by a Raman scattering spectroscopy, and by observation with a transmission electron microscope (TEM) and a scanning electron microscope (SEM) Firstly, whether or not the specimens were single-walled carbon nanotubes were determined by whether the radical breathing mode (RBM), which is peculiar to the single-walled carbon nanotube, was found in the Raman spectrum. Then, whether or not multi-walled carbon nanotubes were included in the single-walled carbon nanotubes were determined by the ratio of the intensity of the G-band observed at around 1590 cm$^{-1}$ in the Raman spectrum to that of the D-band observed at around 1350 cm$^{-1}$, resulting from defects or multi-walled carbon nanotubes. Also, the specimens were checked by observing images obtained with the transmission electron microscope (TEM) and the scanning electron microscope (SEM). The thickness of the layer, or the number of the walls, and the diameter thereof of the produced carbon nanotubes are shown in Table 2.

TABLE 1

|  | Reaction temperature (° C.) | Feedstock supplying temperature (° C.) | Reaction time (second) | Adhesives stuck to the nozzle end |
|---|---|---|---|---|
| Working Example 1 | 800 | 100 | 4 | No |
| Working Example 2 | 900 | 100 | 3 | No |
| Working Example 3 | 1000 | 110 | 2.5 | No |
| Comparative Example 1 | 700 | 50 | 5 | No |
| Comparative Example 2 | 1100 | 110 | 2 | No |
| Comparative Example 3 | 1150 | 120 | 1.5 | No |
| Comparative Example 4 | 1200 | 130 | 1 | No |
| Comparative Example 5 | 1250 | 150 | 0.7 | A little |
| Comparative Example 6 | 1300 | 200 | 0.5 | A little |
| Comparative Example 7 | 1200 | 400 | 1 | Very much |
| Comparative Example 8 | 1350 | 350 | 0.3 | Much |

TABLE 2

|  | Yield of carbon compound (% by mass) | Yield of CNT (% by mass) | Layer thickness (number of walls) | CNT diameter (nm) | Impurities (% by mass) |
|---|---|---|---|---|---|
| Working Example 1 | 0.01 or less | 0.01 or less | 1 | 1 to 2 | about 1 to 2 |
| Working Example 2 | 0.5 | 0.49 | 1 | 1 to 2 | 2 |
| Working Example 3 | 1 | 0.99 | 1 | 1 to 2 | 1 |
| Comparative example 1 | 0.01 or less | No (0) | — | No CNT is generated | 100 (impurities only) |
| Comparative example 2 | 2 | 1.98 | 1 to 2 | 1 to 3 | 1 |
| Comparative example 3 | 5 | 4.98 | 1 to 2 | 1 to 3 | 0.4 |
| Comparative example 4 | 10 | 10 | 1 to 3 | 1 to 3 | 0 |
| Comparative example 5 | 8 | 7.98 | 1 to 3 | 1 to 3 | 0.25 |
| Comparative example 6 | 3 | 2.98 | 1 to 3 | 1 to 3 | 0.67 |
| Comparative example 7 | 5 | 0.01 or less | 10 to 30 | 20 to 50 | 99.99% or more |
| Comparative example 8 | 8 | No (0) | — | No CNT is generated | 100 (impurities only) |

As clearly understood from the results of the Raman scattering spectroscopy, the observation with the electron microscopes, and the data summarized in Table 2, the production of single-walled carbon nanotubes with high purity with very little multi-walled carbon nanotubes were confirmed with all the randomly sample specimen in Working Examples 1-3, in each of which the linear flow velocity of the hydrogen gas, the composition of the feedstock, and the reaction temperature were within the ranges according to the present invention. On the other hand, in Comparative Example 1 the reaction temperature was low, which resulted in the production of multi-walled carbon nanotubes. In each of Comparative Examples 2-7, the reaction temperature was high, which led to the production of multi-walled carbon nanotubes. In Comparative Example 8 the reaction temperature was too high, so that no carbon nanotubes were produced.

As clearly understood from Table 1, in each of Working Examples 1-3 and Comparative 1-6, the temperature at which the feedstock was supplied was not more than the boiling point of toluene, which made it possible to feed the feedstock in a state of mist. As a result, no or little adhesive stuck to the nozzle end was observed. On the other hand, because the feedstock-supplying temperature was not less than 350° C. in Comparative Examples 7 and 8, which evaporated the feedstock at around the nozzle end 19. In other words, the feedstock in the state of gas was fed to the feeding zone. This caused adhesion of a large amount of tar and the like, originating from the hydrocarbon source, to the nozzle end 19 and the nozzle near the end.

INDUSTRIAL APPLICABILITY

The process of producing single-walled carbon nanotubes according to the present invention is capable of producing single-walled carbon nanotubes having unique properties with high purity, and if desired, in a continuous manner and in a large quantity. Therefore, the single-welled carbon nanotubes, because of their unique properties, are expected to be applicable to various technical fields, such as antistatic agents, conductive ink and paint, hydrogen occluding agents, semiconductors, chemical reactions, supports for fuel-cell catalysts, materials for the negative electrode of secondary batteries, sensors, devices, fillers for composite materials, space craft and aircraft technologies, and bio- and medical-technologies.

We claim:

1. A process of producing single-walled carbon nanotubes comprising feeding a feedstock including a hydrocarbon source, a metallocene, and a sulfur compound in a state of mist to a feeding zone located between a nozzle end of a feeding nozzle and a reaction zone at a temperature of 200° C. or less where hydrogen gas flows at a linear velocity of 1 to 50 m/second wherein the amount of the hydrocarbon source is from 0.01 to 0.2% by mass and the amount of the metallocene is from 0.001 to 0.2% by mass based on the total amount of the hydrogen gas and the feedstock, and the amount by mass of the sulfur compound is from ⅛ to 4 times as much as that of the metallocene; and, making the hydrogen gas and the fed feedstock flow through the reaction zone at a temperature of 800 to 1000° C.

2. The process of producing single-walled carbon nanotubes according to the claim 1, wherein the feeding zone has a temperature from 50 to 200° C.

3. The process of producing single-walled carbon nanotubes according to claim 1 or 2, wherein the feedstock passes through the feeding zone in 0.1 to 10 seconds.

4. The process for producing single-walled carbon nanotubes according to claim 3, wherein the produced single-walled carbon nanotubes have an average diameter of 0.5 to 2 nm.

5. The process of producing single-walled carbon nanotubes according to claim 1 or 2, wherein the produced single-walled carbon nanotubes have an average diameter of 0.5 to 2 nm.

6. The process of producing single-walled nanotubes according to claim 2, wherein the feeding zone has a temperature from 80 to 130° C.

7. The process of producing single-walled carbon nanotubes according to claim 6, wherein the temperature of the feeding zone gradually rises from a location where the feedstock is supplied to the feeding zone, toward the reaction zone.

8. The process of producing single-walled carbon nanotubes according to claim 2, wherein the feeding zone has a temperature which gradually rises from a location where the feedstock is supplied to the feeding zone, toward the reaction zone.

9. The process of producing single-walled carbon nanotubes according to claim 8, wherein the feedstock is fed in generally the same direction as the hydrogen gas.

10. The process of producing single-walled carbon nanotubes according to claim 9, wherein the feedstock is continuously fed to the feeding zone, thereby continuously producing single-walled carbon nanotubes.

11. The process of producing single-walled carbon nanotubes according to claim 8, wherein the feedstock and the hydrogen gas flow downward and generally vertically through the feeding zone and the reaction zone in this order.

12. The process of producing single-walled carbon nanotubes according to claim 2, wherein the feedstock is fed in generally the same direction as the hydrogen gas.

13. The process of producing single-walled carbon nanotubes according to claim 12, wherein the feedstock is continuously fed to the feeding zone, thereby continuously producing single-walled carbon nanotubes.

14. The process of producing single-walled carbon nanotubes according to claim 2, wherein the feedstock and the hydrogen gas flow downward and generally vertically through the feeding zone and the reaction zone in this order.

15. The process of producing single-walled carbon nanotubes according to claim 1, wherein the feedstock is fed in generally the same direction as the hydrogen gas.

16. The process of producing single-walled carbon nanotubes according to claim 15, wherein the feedstock is continuously fed to the feeding zone, thereby continuously producing single-walled carbon nanotubes.

17. The process of producing single-walled carbon nanotubes according to claim 1, wherein the feedstock and the hydrogen gas flow downward and generally vertically through the feeding zone and the reaction zone in this order.

* * * * *